Nov. 2, 1926.
C. K. HOLT
1,605,187
LOCKING DEVICE FOR SWIVEL HOOKS
Filed March 23, 1926
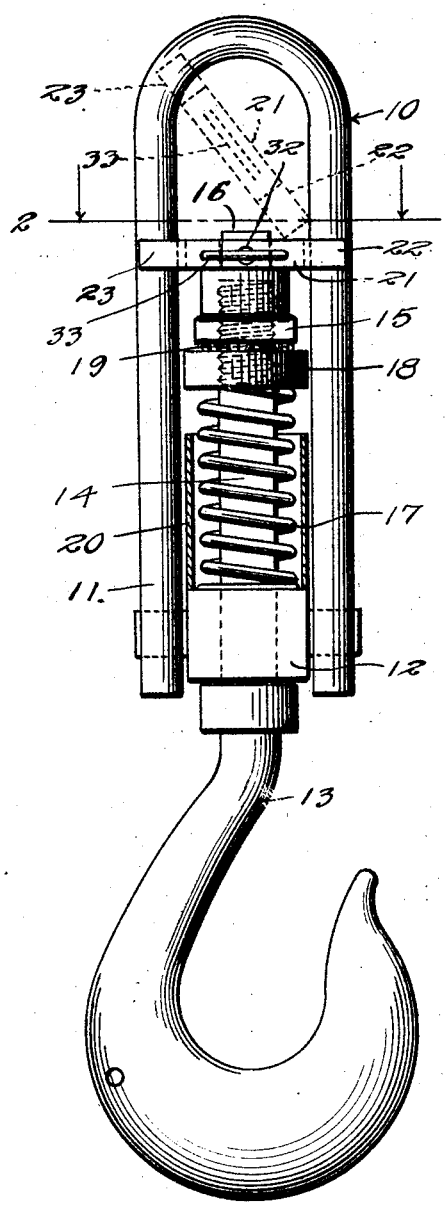
Inventor
C. K. Holt.
By Watson E. Coleman
Attorney Patented Nov. 2, 1926.

1,605,187

UNITED STATES PATENT OFFICE.

CHARLIE K. HOLT, OF TAFT, CALIFORNIA.

LOCKING DEVICE FOR SWIVEL HOOKS.

Application filed March 23, 1926. Serial No. 96,848.

This invention relates to locking devices for swivel hooks and more particularly to a device for preventing rotation of the hook with relation to the clevis thereof.

An important object of this invention is to provide a device which may be readily applied to and removed from the hook and the construction of which will permit vertical movement of the hook with relation to the clevis.

A further object of the invention is to provide a device of this character which may be readily and cheaply produced and will be durable and efficient in service.

These and other objects I attain by the construction shown in the accompanying drawing, wherein for the purpose of illustration is shown a preferred embodiment of my invention and wherein:—

Figure 1 is a side elevation of a swivel hook embodying a locking device constructed in accordance with my invention, the manner of applying the device being illustrated in dotted lines;

Figure 2 is an enlarged section upon the line 2—2 of Figure 1;

Figure 3 is an enlarged section on the line 3—3 of Figure 2.

Referring now more particularly to the drawings, the numeral 10 designates a U-shaped clevis between the lower ends of the arms 11 of which is pivoted a block 12. A hook 13 has its shank 14 slidably and rotatably directed through the block 12. At its upper end, this shank is provided with a nut 15 which, in accordance with my invention, has its upper end squared, as at 16. A spring 17 seats upon the block 12 and surrounds the shank 14. Slidable upon the shank 14 at the upper end thereof is a collar 18 and between the upper surface of the collar 18 and the lower face of the nut 15, anti-friction elements 19 are disposed, to thereby support the hook 13 for ready rotation. In constructions of this character, a sleeve 20 usually arises from the block 12 to house the spring 17 and to provide a limit for downward movement of the sleeve 18 and accordingly of the shank of the hook 13.

My lock comprises a flat block of metal, designated at 21 and of a length to fit between the adjacent faces of the arms 11 of the clevis. At one end, this block has projecting therefrom arms 22 which are spaced apart a distance equal to the thickness of the arms of the clevis while at the opposite end thereof a single projecting arm 23 is provided. In the center of the block, an opening 24 of the same shape as the upper end of the nut is provided. The facets at the upper end of the nut are provided with sockets 25 and one face of the block 21 has formed therein a bore 26 communicating at its inner end with the opening 24. The outer end of this bore is enlarged and screw-threaded, as at 27, for the reception of a threaded disk 28 having an opening 29 at its center. Through this opening is directed the shank 29ª of a plunger having at its inner end a tit 30 for engagement in the sockets 25 and adjacent this inner end a flange for engagement by a spring 31, the opposite end of which engages against the disk 28. The outer end of the plunger is provided with a head 32 by means of which it may be withdrawn and this head is preferably bridged by a U-shaped guard 33 so that it may not be contacted with or damaged by tools employed about the rig or when the lock is removed.

It will be obvious that due to the construction of the locking member, this locking member may be slightly canted, as indicated in dotted lines in Figure 1, and so placed between the arms 11 of the clevis until one arm of the clevis engages the arm 23 of the block and the other arm of the clevis is aligned with the space between the arms 22. The lock is then shifted to horizontal position and lowered over the upper end of the nut to its proper position, at which time the plunger will engage its tit 30 in one of the notches 25 to prevent accidental displacement of the block with relation to the nut. It will be noted that with the lock in place, rotation of the hook is effectually prevented and at the same time, vertical movement of the hook against the action of the spring 17 is permitted.

It will also be obvious that the construction hereinbefore set forth is capable of a certain range of change and modification without materially departing from the spirit of the invention and I accordingly do not limit myself to such specific structure except as hereinafter claimed.

I claim:—

1. In combination with a clevis embodying parallel arms, a block carried by the lower ends of the arms, a hook having its shank rotatably and slidably directed through said block and extending between said arms and a nut at the upper end of the shank, means for preventing rotation of the hook comprising a member insertable between the arms of the clevis and having guiding elements engaging each of the arms, the member having an opening receiving the upper end of the nut and coacting means upon the member and nut preventing displacement of the block with relation to the nut.

2. In combination with a clevis embodying parallel arms, a block carried by the lower ends of the arms, a hook having its shank rotatably and slidably directed through said block and extending between said arms and a nut at the upper end of the shank, means for preventing rotation of the hook comprising a member insertable between the arms of the clevis and having guiding elements engaging each of the arms, the member having an opening receiving the upper end of the nut and a spring pressed plunger carried by the member and projectable into the opening thereof, the nut having sockets for the reception of the inner end of the plunger.

3. In combination with a clevis embodying parallel arms, a block carried by the lower ends of the arms, a hook having its shank rotatably and slidably directed through said block and extending between said arms and a nut at the upper end of the shank, means for preventing rotation of the hook comprising a member insertable between the arms of the clevis and having guiding elements engaging each of the arms, the member having an opening receiving the upper end of the nut, coacting means upon the member and nut preventing displacement of the block with relation to the nut, said guiding elements including spaced arms projecting from one side of the member and adapted to receive therebetween one of the arms of the clevis and a further arm projecting from the opposite side of the member and adapted to engage against the opposite arm of the clevis.

4. In combination with a clevis embodying parallel arms, a block carried by the lower ends of the arms, a hook having its shank rotatably and slidably directed through said block and extending between said arms and a nut at the upper end of the shank, means for preventing rotation of the hook comprising a member insertable between the arms of the clevis and having guiding elements engaging each of the arms, the member having an opening receiving the upper end of the nut, a spring pressed plunger carried by the member and projectable into the opening thereof, the nut having sockets for the reception of the inner end of the plunger, the outer end of the plunger having a head whereby it may be withdrawn from said sockets against the action of the spring thereof and a guard for the head of the plunger carried by the member.

In testimony whereof I hereunto affix my signature.

CHARLIE K. HOLT.